United States Patent
Bode et al.

(10) Patent No.: US 7,519,447 B1
(45) Date of Patent: Apr. 14, 2009

(54) METHOD AND APPARATUS FOR INTEGRATING MULTIPLE SAMPLE PLANS

(75) Inventors: Christopher A. Bode, Austin, TX (US); Kevin R. Lensing, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 311 days.

(21) Appl. No.: 10/958,949

(22) Filed: Oct. 5, 2004

(51) Int. Cl.
*G06F 19/00* (2006.01)

(52) U.S. Cl. .................... 700/110; 700/109; 700/121; 700/31; 438/16

(58) Field of Classification Search ................ 700/109, 700/110, 121, 31; 438/16
See application file for complete search history.

(56) References Cited

U.S. PATENT DOCUMENTS

| | | | | |
|---|---|---|---|---|
| 5,450,205 | A * | 9/1995 | Sawin et al. ............. | 356/632 |
| 6,594,002 | B2 * | 7/2003 | Drohan et al. ........... | 356/73 |
| 6,738,682 | B1 * | 5/2004 | Pasadyn ................. | 700/100 |
| 6,834,213 | B1 * | 12/2004 | Sonderman et al. ....... | 700/121 |
| 6,956,644 | B2 * | 10/2005 | Biellak et al. ............ | 356/237.4 |
| 2002/0193899 | A1 * | 12/2002 | Shanmugasundram et al. ... | 700/108 |
| 2003/0180973 | A1 * | 9/2003 | Lehman et al. ........... | 438/14 |
| 2003/0181131 | A1 * | 9/2003 | Lehman et al. ........... | 451/5 |
| 2003/0181132 | A1 * | 9/2003 | Lehman et al. ........... | 451/5 |
| 2003/0181138 | A1 * | 9/2003 | Lehman et al. ........... | 451/5 |
| 2005/0247877 | A1 * | 11/2005 | Mackin et al. ........... | 250/341.1 |

OTHER PUBLICATIONS

"Development of Cost Effective Sampling Strategy for In-Line Monitoring" -Tomlinson et al, IBM Corporation, IEEE 1997.*
"Robustness evaluation of cost-optimum sampling plan for in-line wafer inspection using Taguchi methods" -Suzuki et al, Osaka University, IEEE 2005.*
"Super Sparse Overlay Sampling Plans: An Evaluation of Methods and Algorithms for Optimizing Overlay Quality Control and Metrology Tool Throughput" -Pellegrini, Joseph, New Vision Systems, INC, Society of Photo-Optical Instrumentation Engineers, 1999.*

* cited by examiner

*Primary Examiner*—Michael D Masinick
(74) *Attorney, Agent, or Firm*—Williams, Morgan & Amerson (57) ABSTRACT

The present invention provides a method and apparatus for integrating multiple sample plans. The method includes receiving a first wafer state data set from an in situ wafer measurement device, the first wafer state data set being indicative of at least one characteristic of at least one wafer processed by a processing tool and receiving a second wafer state data set from an ex situ wafer measurement device, the second wafer state data set being indicative of the at least one characteristic of the at least one wafer processed by the processing tool. The method also includes forming a third wafer state data set using the first and second wafer state data sets and determining the at least one characteristic of the at least one wafer based upon the third wafer state data set.

22 Claims, 4 Drawing Sheets

METHOD AND APPARATUS FOR INTEGRATING MULTIPLE SAMPLE PLANS

BACKGROUND OF THE INVENTION

1. Field of the Invention

This invention relates generally to the field of semiconductor device manufacturing and, more particularly, to a method and apparatus for integrating multiple sample plans.

2. Description of the Related Art

Advanced process control (APC) systems are often used to coordinate operation of processing tools used to fabricate a semiconductor device. The processing tools may include photolithography steppers, etch tools, deposition tools, polishing tools, rapid thermal processing tools, ion implantation tools, and the like. Wafers (or wafer lots) are processed in the tools in a predetermined order and each processing tool modifies the wafers according to a particular operating recipe. For example, a photolithography stepper may be used to form a patterned layer of photoresist above the wafer. Features in the patterned layer of photoresist correspond to a plurality of features, e.g. gate electrode structures, which will ultimately be formed above the surface of the wafer.

The APC system includes a variety of devices for collecting data indicative of the physical state of one or more wafers before, during, and/or after processing by the processing tools. The collected data indicative of physical state of the wafer is typically referred to as wafer state data. The collected wafer state data may then be provided to the APC system, which may use the collected wafer state data to characterize the wafer and/or to detect faults associated with the processing. For example, a mean critical dimension associated with the various features may be indicative of a performance level of devices formed on the wafer and/or the wafer lot. If the wafer state data indicates that the mean critical dimension associated with the feature, e.g., a gate electrode feature, is on the lower end of an allowable range for such feature sizes, then this may indicate that the device formed on the wafer may exhibit relatively high performance levels. Higher performance devices may be sold at a higher price, thereby increasing the profitability of the manufacturing operation. However, the wafer state data may indicate that devices formed on the wafer and/or wafer lot have a relatively low performance level or are faulty if the mean critical dimension is near an upper end of the allowable range or falls outside of the allowable range.

Wafer state data may be collected by sensors incorporated within a processing tool, such as scatterometers, ellipsometers, and the like, in which case the wafer state data is referred to as in situ wafer state data. The in situ wafer state data may include measurements of a temperature of the wafer, a thickness of a layer of material formed above the wafer, a critical dimension of a feature formed above the wafer, or other characteristic parameters. Wafer sampling by the in situ sensors can increase the time spent by the wafer in the processing tool and so, in order to maintain a desired throughput, sensors usually perform gross metrology in which a small and/or isolated region on each wafer is sampled with relatively low accuracy.

Wafer state data may also be collected by devices external to the processing tool, in which case the wafer state data is referred to as ex situ wafer state data. The ex situ wafer state data may include a thickness of a layer formed above the wafer, a critical dimension (CD) of a feature formed above the wafer, and the like. For example, an integrated metrology tool, i.e. a metrology tool that is coupled to a processing tool, may be used to collect ex situ wafer state data from a subset of the wafers that have been processed in the processing tool. Relative to sensors included within the processing tool, integrated metrology tools typically perform higher accuracy measurements and/or measurements at a higher granularity. However, at least in part to maintain a desired throughput, the integrated metrology tools perform these measurements on a smaller number of wafers and/or on a smaller area on the wafer. For another example, a stand-alone metrology tool, i.e. a metrology tool that is physically separate from the processing tools, may be used to collect ex situ wafer state data from a subset of the wafers that have been processed in the processing tool. Compared to integrated metrology tools, stand-alone metrology tools typically perform higher accuracy and/or higher granularity measurements, but on a smaller number of wafers and/or on a smaller area of the wafer.

Conventional APC systems treat the wafer state data collected by different metrology tools as independent data sets, which may limit the ability of the conventional APC system to characterize wafers. Treating the wafer state data sets independently may also reduce the efficiency of a fabrication facility controlled by a conventional APC system. For example, a sensor, an integrated metrology tool, and a stand-alone metrology tool associated with a processing tool may each measure a mean critical dimension associated with various features formed above a wafer lot by performing measurements on the same, overlapping, and/or different sites on each wafer. Thus, the mean critical dimension may be determined using redundant information from the sensor, the integrated metrology tool, and/or the stand-alone metrology tool. Moreover, since the integrated and stand-alone metrology tools typically take longer to perform measurements, the redundant information may be acquired at a substantial cost in time and/or throughput.

The present invention is directed to addressing the effects of one or more of the problems set forth above.

SUMMARY OF THE INVENTION

In one embodiment of the instant invention, a method is provided for integrating multiple sample plans. The method includes receiving a first wafer state data set from an in situ wafer measurement device, the first wafer state data set being indicative of at least one characteristic of at least one wafer processed by a processing tool and receiving a second wafer state data set from an ex situ wafer measurement device, the second wafer state data set being indicative of the at least one characteristic of the at least one wafer processed by the processing tool. The method also includes forming a third wafer state data set using the first and second wafer state data sets and determining the at least one characteristic of the at least one wafer based upon the third wafer state data set.

In another embodiment of the present invention, a manufacturing system is provided for integrating multiple sample plans. The manufacturing system includes at least one processing tool for processing at least one wafer, at least one in situ wafer measurement device configured to provide a first wafer state data set indicative of at least one characteristic of the at least one wafer, and at least one ex situ wafer measurement device configured to provide a second wafer state data set indicative of the at least one characteristic of the at least one wafer. The manufacturing system also includes a wafer characterization unit configured to receive the first wafer state data set, receive the second wafer state data set, form a third wafer state data set using the first and second wafer state data sets, and determine the at least one characteristic of the at least one wafer based upon the third wafer state data set.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 1:
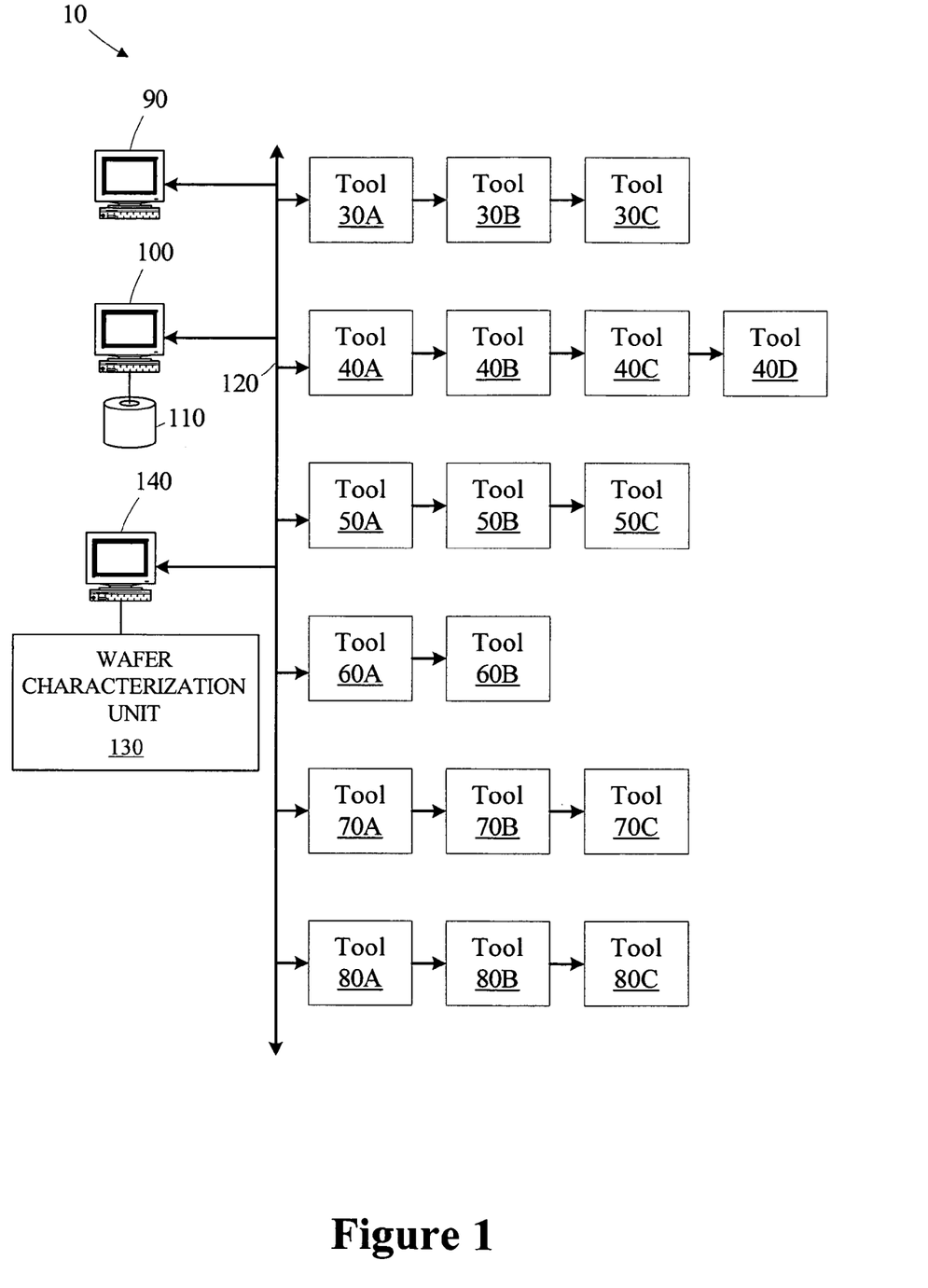
FIG. 1 is a simplified block diagram of a manufacturing system, in accordance with the present invention.

FIG. 1 shows a simplified block diagram of an illustrative manufacturing system 10. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to , microprocessors, memory devices, digital signal processors, application specific integrated circuits (ASICs), or other similar devices. The techniques may also be applied to workpieces or manufactured items other than semiconductor devices.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif. However, persons of ordinary skill in the art should appreciate that the present invention is not limited to the Catalyst APC system. In alternative embodiments, any desirable information exchange and process control framework may be used without departing from the scope of the present invention.

The manufacturing system 10 includes a plurality of tools 30-80. The tools 30-80 are grouped into sets of like tools, as denoted by lettered suffixes. For example, the set of tools 30A-30C represent tools of a certain type, such as a chemical mechanical planarization tool. A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal processing tools, implantation tools, and the like. The tools 30-80 are depicted in a rank and file grouping for illustrative purposes only. In an actual implementation, the tools 30-80 may be arranged in any physical order or grouping.

A manufacturing execution system (MES) server 90 directs high level operation of the manufacturing system 10. The MES server 90 monitors the status of the various entities in the manufacturing system 10 (i.e., wafer lots, tools 30-80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, and the like. The processing and data storage functions are distributed amongst the different computers or workstations in FIG. 1 to provide general independence and central information storage. However, persons of ordinary skill in the art should appreciate that different numbers of computers and different arrangements may be used without departing from the scope of the instant invention.

A network 120 interconnects various components of the manufacturing system 10, such as the tools 30-80 and the servers 90, 100, allowing them to exchange information. In one embodiment, each of the tools 30-80 is coupled to a computer (not shown) for interfacing with the network 120. Additionally, the connections between the tools 30-80 in a particular grouping are meant to represent connections to the network 120, rather than interconnections between the tools 30-80. In various alternative embodiments, the network 120 may be an Internet, intranet, or any other desirable type of network. Persons of ordinary skill in the art should appreciate that the network 120 may include a variety of routers, hubs, switches, connectors, interfaces, cables, wires, and the like that are not shown in FIG. 1.

A wafer characterization unit 130 is coupled to the network 120. In the illustrated embodiment, the wafer characterization unit 130 is implemented in a computer 140, which may be coupled to the network 120 in any desirable manner. As will be discussed in detail below, in one embodiment, the wafer characterization unit 130 receives a wafer state data set from an in situ wafer measurement device, such as a sensor within one or more of the tools 30-80. The in situ wafer state data set includes information indicative of at least one characteristic of wafers processed by the tools 30-80, such as a temperature of the wafer, a critical dimension of one or more features formed above the wafer, a thickness of one or more layers formed above the wafer, and the like.

In one embodiment, which may be practiced in addition to or in place of the aforementioned embodiment including an in situ device, the wafer characterization unit 130 receives a wafer state data set from an ex situ wafer measurement device, such as an integrated metrology tool associated with one or more of the tools 30-80. The ex situ wafer state data set also includes information indicative of the characteristic of the wafers processed by the one or more tools 30-80. In another embodiment, which may be practiced in addition to or in place of the aforementioned embodiments, the wafer characterization unit 130 may also receive ex situ wafer state data from an ex situ wafer measurement device that is not physically coupled to one or more of the tools 30-80, such as a stand-alone metrology tool.

As will be discussed in detail below, the wafer characterization unit 130 forms a third wafer state data set using at least two wafer state data sets, such as the in situ and/or ex situ wafer state data sets, and determines at least one characteristic of the wafers based upon the third wafer state data set. For example, a wafer characterization unit 130 may determine a mean critical dimension associated with one or more features formed above the wafers using the third wafer state data set.

Figure 2:
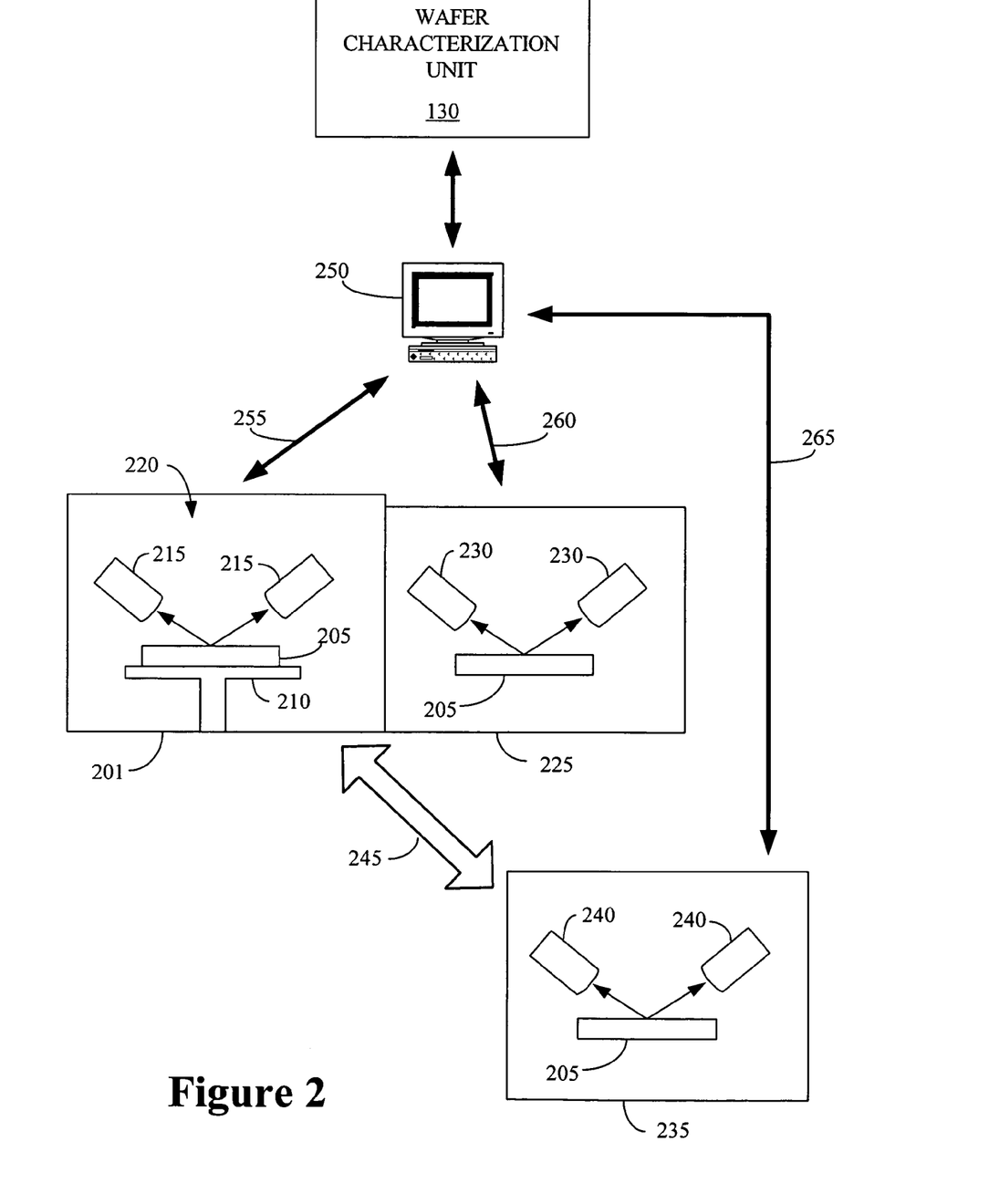
FIG. 2 conceptually illustrates an exemplary embodiment of a portion of a manufacturing system including a processing tool that is communicatively coupled to a wafer characterization unit, in accordance with the present invention.

FIG. 2 conceptually illustrates an exemplary embodiment of a portion of a manufacturing system 200 including a processing tool 201 that is communicatively coupled to the wafer characterization unit 130. In the illustrated embodiment, the processing tool 201 includes a wafer 205 disposed upon a platform or wafer stage 210. Persons of ordinary skill in the art should appreciate that the processing tool 201 may include other components not shown in FIG. 2. For example, the processing tool 201 may include various power connections and/or valves to control the flow of various process gases. In the interest of clarity, only those components of the processing tool 201 that are relevant to the present invention will be discussed herein. Furthermore, the wafer 205 may be part of a wafer lot (not shown).

The processing tool 201 includes one or more wafer measurement devices 215, such as sensors, for collecting in situ wafer state data. The present invention is not limited to any particular type of in situ wafer measurement devices 215. In various alternative embodiments, the in situ wafer measurement devices 215 may be any desirable type of device, or any desirable combination of types of devices, for collecting wafer state data. For example, the in situ wafer measurement devices 215 may include scatterometers, ellipsometers, in situ metrology tools, and the like that are deployed in a chamber 220 of the processing tool 201. Moreover, the present invention is not limited to any particular number of in situ wafer measurement devices 215. In alternative embodiments, the processing tool 201 may include more or fewer in situ wafer measurement devices 215 than are shown in FIG. 2.

The manufacturing system 200 includes at least one ex situ wafer metrology tool 225. In the illustrated embodiment, the ex situ wafer metrology tool 225 is an integrated metrology tool that is physically coupled to the processing tool 201. However, in alternative embodiments, the ex situ wafer metrology tool 225 may be any desirable type of wafer metrology tool. The wafer metrology tool 225 includes one or more wafer measurement devices 230 for collecting ex situ wafer state data. The ex situ wafer measurement devices 230 may include scatterometers, ellipsometers, ex situ metrology tools, and the like. Moreover, the present invention is not limited to any particular number of ex situ wafer measurement devices 230. In alternative embodiments, the ex situ wafer measurement device 225 may include more or fewer ex situ wafer measurement devices 230 than are shown in FIG. 2.

In one alternative embodiment, which may be practiced in place of or in addition to the aforementioned embodiments that include the integrated ex situ wafer metrology tool 225, the manufacturing system 200 may include an ex situ wafer measurement device 235 that is not physically coupled to the processing tool 201. For example, the manufacturing system 200 may include a stand-alone metrology tool. However, in alternative embodiments, the ex situ wafer metrology tool 235 may be any desirable type of wafer metrology tool. The wafer metrology tool 235 includes one or more wafer measurement devices 240 for collecting ex situ wafer state data. The ex situ wafer measurement devices 240 may include scatterometers, ellipsometers, ex situ metrology tools, and the like. Moreover, the present invention is not limited to any particular number of ex situ wafer measurement devices 240. In alternative embodiments, the ex situ wafer metrology tool 235 may include more or fewer ex situ wafer measurement devices 240 than are shown in FIG. 2.

The wafer 205 (or one or more wafer lots including the wafer 205) may be provided to the processing tool 201, the ex situ measurement tool 225, and, if present, the ex situ measurement tool 235, in any desirable order. In one embodiment, the wafer 205 is transferred from the processing tool 201 to the ex situ measurement tool 225 substantially after processing is complete. However, the present invention is not limited to transferring the wafer 205 to the ex situ measurement tool 225 after processing in the processing tool 201 is complete. In one alternative embodiment, the wafer 205 is transferred from the processing tool 201 to the ex situ wafer metrology tool 225 between processing steps carried out by the processing tool 201. In one embodiment in which the ex situ wafer metrology tool 235 is present, the wafer 205 is transferred from the processing tool 201 to the ex situ wafer metrology tool 235 substantially after undergoing processing in the processing tool 201, as indicated by the arrow 245. Alternatively, the wafer 205 may be transferred from the ex situ wafer metrology tool 235 to the processing tool 201 substantially before undergoing processing in the processing tool 201.

The in situ wafer measurement devices 215, the ex situ wafer metrology tool 225, and the ex situ wafer metrology tool 235, if present, are communicatively coupled to an equipment interface 250, such as a computer, by one or more interfaces 255, 260, 265, respectively. Persons of ordinary skill in the art should appreciate that the one or more interfaces 255, 260, 265 may include components that are not shown in FIG. 2 such as processing units, data communication ports, routers, switches, hubs, cables, wires, connectors, and the like. The equipment interface 250 may be communicatively coupled to the wafer characterization unit 130 in any desirable manner. In one embodiment, the equipment interface 250 is communicatively coupled to the wafer characterization unit 130 via the network 120 (shown in FIG. 1).

The equipment interface 250 receives in situ and/or ex situ wafer state data from the in situ wafer measurement devices 215, the ex situ wafer metrology tool 225, and/or the ex situ wafer metrology tool 235 and provides the wafer state data to the wafer characterization unit 130. In one embodiment, the equipment interface 250 provides the wafer state data to the wafer characterization unit 130 substantially unchanged. However, persons of ordinary skill in the art should appreciate that, in alternative embodiments, the equipment interface 250 may modify the in situ and/or ex situ wafer state data before providing this data to the wafer characterization unit 130. For example, the equipment interface 250 may change the format of the in situ and/or ex situ wafer state data.

The in situ wafer measurement devices 215, the ex situ wafer metrology tool 225, and the ex situ wafer metrology tool 235 may collect wafer state data associated with a portion of the wafer 205 and/or the wafer lot including the wafer 205. In one embodiment, portions of the wafer 205 and/or the wafer lot including the wafer 205 may be sampled by more than one of the wafer measurement devices 215, 230, 240. However, the present invention is not limited to embodiments wherein the sampled portions of the wafer 205 and/or the wafer lot including wafer 205 overlap. In one alternative embodiment, the in situ wafer measurement devices 215, the ex situ wafer metrology tool 225, and the ex situ wafer metrology tool 235 may sample distinct portions of the wafer 205 and/or the wafer lot including the wafer 205.

Figure 3A:
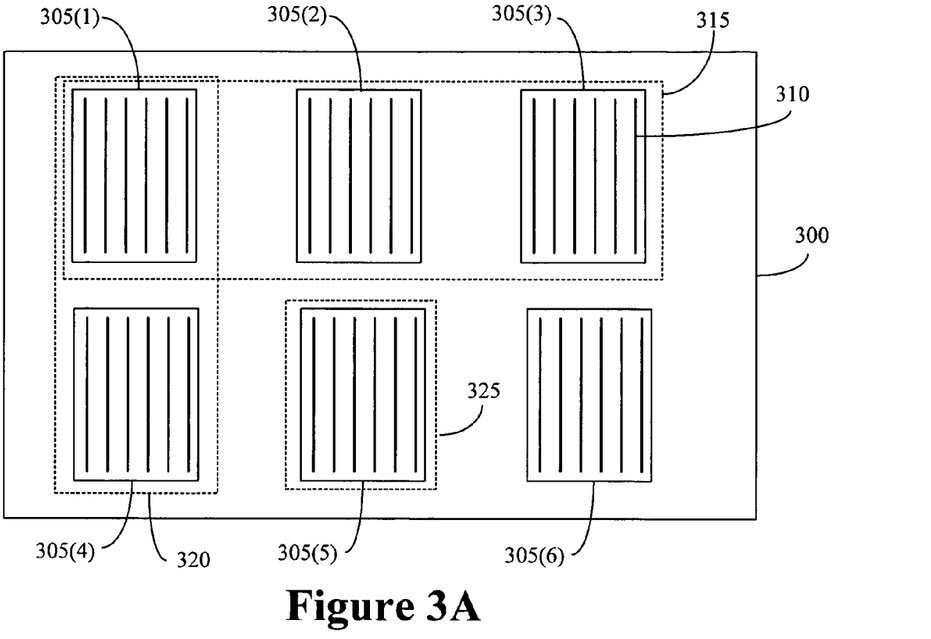
FIG. 3A conceptually illustrates one exemplary embodiment of a wafer including a plurality of regions.

FIG. 3A conceptually illustrates one exemplary embodiment of the wafer 300 including a plurality of regions 305(1-6). Although six regions 305(1-6) are depicted in FIG. 3A, persons of ordinary skill in the art should appreciate that the present invention is not limited to any particular number of regions 305(1-6). In alternative embodiments, more or fewer regions 305(1-6) may be present on the wafer 300. In the illustrated embodiment, each of the regions 305(1-6) includes a plurality of features 310. Although the features 310 are shown as line features, the present invention is not limited to line features. In alternative embodiments, the features may be any desirable feature formed on the wafer 300, such as gates, trenches, vias, isolation regions, doped regions, dopant-depleted regions, and the like. Moreover, the regions 305(1-6) may include any desirable number and/or combination of types of features.

In the illustrated embodiment, the in situ wafer measurement devices 215 (shown in FIG. 2) sample the regions 305 (1-3), as indicated by the dotted line 315. For example, the in situ wafer measurement device 215 may be a scatterometer that collects data by irradiating the selected regions 305(1-3) and collecting scattered light. The ex situ wafer measurement devices 230 (shown in FIG. 2) sample the regions 305(1), 305(4), as indicated by the dotted line 320, and the ex situ wafer measurement devices 240 (shown in FIG. 2) sample the regions 305(5), as indicated by the dotted line 325. Thus, the region 305(1) is sampled by the in situ wafer measurement devices 215 and the ex situ wafer measurement devices 230, the regions 305(2-3) are sampled by the in situ wafer measurement devices 215, the region 305(4) is sampled by the ex situ wafer measurement devices 230, the region 305(5) is sampled by the ex situ wafer measurement devices 240, and the region 305(6) is not sampled.

Figure 3B:
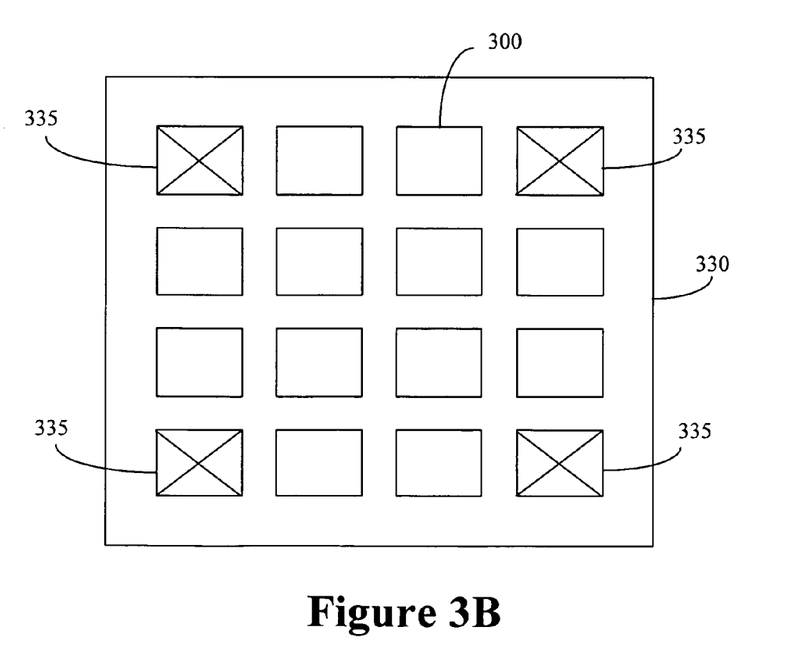
FIG. 3B conceptually illustrates one exemplary embodiment of a wafer lot including a plurality of wafers, such as the wafer shown in FIG. 3A.

FIG. 3B conceptually illustrates one exemplary embodiment of a wafer lot 330 including a plurality of wafers 300 (only one indicated in FIG. 3B). The wafer lot 330 includes a plurality of sampled wafers 335. The embodiment illustrated in FIG. 3B is intended to represent the wafers 300 that are sampled by one wafer measurement device 215, 230, 240. However, the present invention is not limited to the particular number, percentage, or location of the sample wafers 335 shown in FIG. 3B. Moreover, persons of ordinary skill in the art should appreciate that the number, percentage, and/or locations of the sampled wafers 335 may vary for different wafer measurement device 215, 230, 240. One or more of the sample wafers 335 may be sampled by more than one wafer measurement device 215, 230, 240.

Referring back to FIG. 2, the wafer characterization unit 130 may provide information indicative of the sample regions 315, 320, 325 and/or the sample wafers 335 to the processing tool 210 and/or the wafer metrology tools 225, 235, which may use the information to control operation of one or more of the wafer measurement devices 215, 230, 240 to sample the desired regions 315, 320, 325 and/or wafers 335. For example, the wafer characterization unit 130 may provide a sampling plan indicative of the sample regions 315, 320, 325 and/or the sample wafers 335 to the processing tool 210 and/or the wafer metrology tools 225, 235. As will be discussed in detail below, the wafer characterization unit 130 may modify the information indicative of the sample regions 315, 320, 325 and/or the sample wafers 335.

Figure 4:
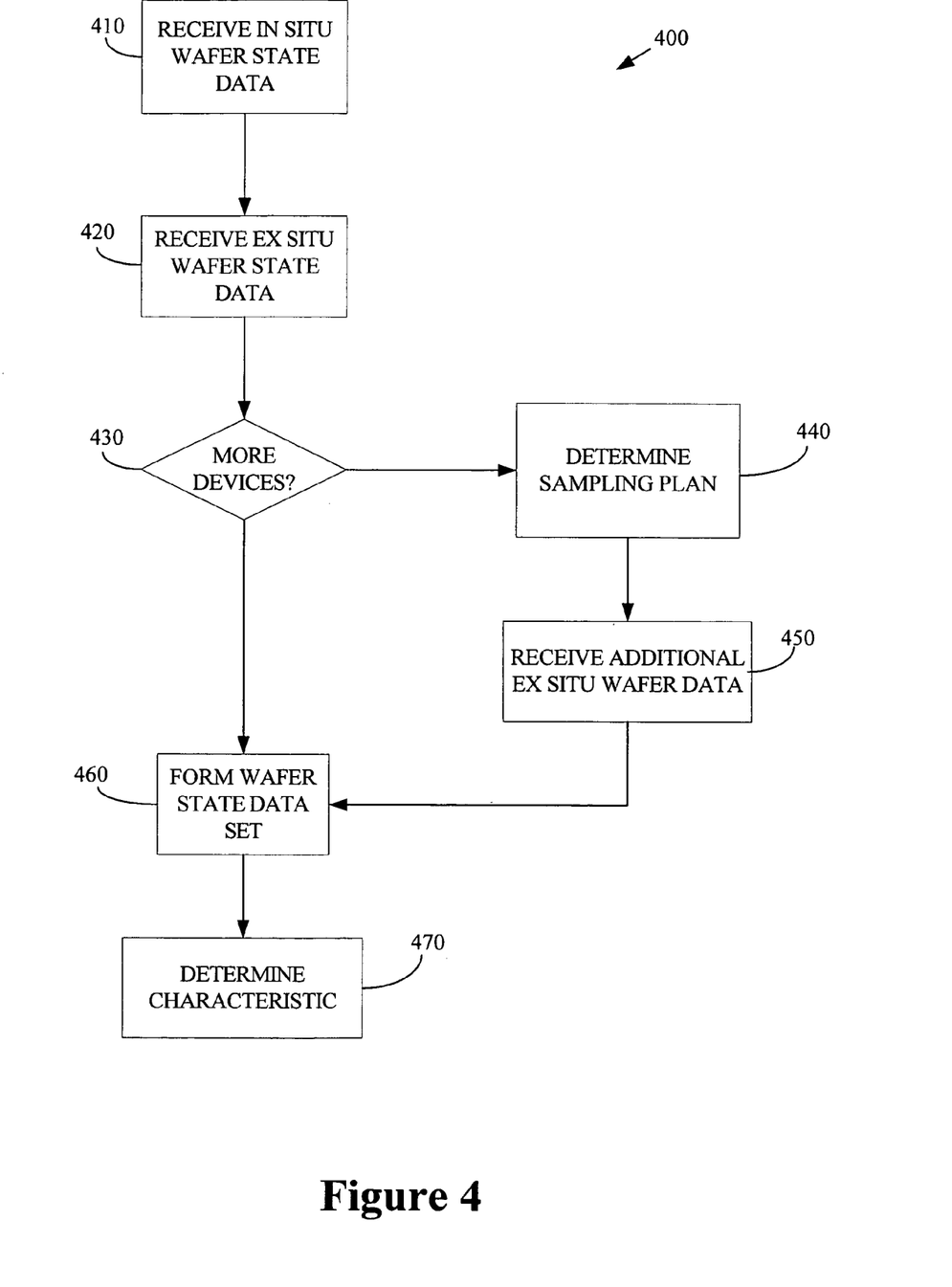
FIG. 4 conceptually illustrates one exemplary embodiment of a method for characterizing one or more wafers, in accordance with the present invention.

FIG. 4 conceptually illustrates one exemplary embodiment of a method for characterizing one or more wafers, in accordance with the present invention. In the illustrated embodiment, in situ wafer state data is received (at 410) from an in situ wafer measurement device. Wafer state data is also received (at 420) from an ex situ wafer measurement device. For example, ex situ wafer state data may be received from an integrated metrology tool. For another example, ex situ wafer state data may be received from a stand-alone metrology tool. In one embodiment, the wafer state data may include information indicative of a site and/or a location of a sampled wafer or a sampled region on a wafer, a date and/or time stamp, and indication of a feature type, and the like.

If any additional wafer measurement devices, such as a stand-alone metrology tool, are determined (at 430) to be available, a sampling plan may be determined (at 44). In one embodiment, the sampling plan is a predetermined sampling plan that is provided to the wafer characterization unit and/or the wafer measurement device. In one alternative embodiment, the sampling plan is modified based upon the in situ wafer state data and/or the ex situ wafer state data. For example, the in situ wafer state data may be received (at 410) from a sensor and the ex situ wafer state data may be received (at 420) from an integrated metrology tool. If the sensor and the integrated metrology tools adequately characterize the wafer, as determined by an engineer or a predetermined criterion, the sampling plan may be modified such that the stand-alone metrology tool examines a reduced number of regions and/or wafers with higher accuracy, resolution, granularity, time, and the like. Alternatively, if the sensor and the integrated metrology tools do not adequately characterize the wafer, as determined by an engineer or a predetermined criterion, the sampling plan may be modified such that the stand-alone metrology tool examines a larger number of regions and/or wafers with lower accuracy, resolution, granularity, time, and the like. In alternative embodiments, sampling plans for other wafer measurement devices and/or tools may also be modified. The additional wafer state data, e.g. the ex situ wafer state data collected by the stand-alone metrology tool, is received (at 450).

A wafer state data set is formed (at 460) using the in situ wafer state data and the ex situ wafer state data. In one embodiment, forming (at 460) the wafer state data set includes combining the in situ wafer state data and the ex situ wafer state data. For example, the wafer state data set may comprise a union of the in situ wafer state data and the ex situ wafer state data. If one or more sampled regions overlap, forming (at 460) the wafer state data set may also include combining or merging data associated with the overlapping regions. In alternative embodiments, forming (at 460) the wafer state data set may also include comparing overlapping portions of the wafer state data set, calibrating the wafer state data set, matching overlapping portions of the wafer state data set, and the like. Persons of ordinary skill in the art should appreciate that the aforementioned embodiments are exemplary and not intended to limit the present invention. In various alternative embodiments, the number and/or type of possible operations that may be used to form (at 460) the wafer state data set may vary widely.

One or more characteristics of the wafers and/or wafer lots is determined (at 470) using the wafer state data set. For example, characteristics such as a mean critical dimension, a wafer or layer thickness, and the like may be determined (at 470) using the wafer data set. Second and/or third order characteristics may also be determined (at 470). For example, when the stand-alone sampling plan is modified so that the stand-alone metrology tool samples a reduced number of regions and/or wafers with higher accuracy, resolution, granularity, time, and the like, second and/or third order characteristics such as non-uniformities in thickness or critical dimension, line features such as corner rounding and/or footing, various process health indicators, and the like may be determined (at 470).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

receiving a first wafer state data set from a first wafer measurement device, the first wafer state data set being indicative of at least one characteristic of at least one wafer processed by a processing tool to form a portion of an electronic component of a semiconductor device, the electronic component being formed above said at least one wafer by the processing tool;

receiving a second wafer state data set from a second wafer measurement device, the second wafer state data set being indicative of the at least one characteristic of the at least one wafer processed by the processing tool;

determining a sampling plan for at least one third measurement device in response to determining whether the first and second wafer state data sets adequately characterize said at least one characteristic of said at least one wafer;

receiving at least one third wafer state data set from the third wafer measurement device, the third wafer state data set being collected according to the sampling plan and being indicative of said at least one characteristic of said at least one wafer;

forming a fourth wafer state data set using the first, second, and third wafer state data sets; and determining the at least one characteristic of the at least one wafer based upon the fourth wafer state data set.

2. The method of claim 1, wherein receiving the first and second wafer state data sets comprises receiving first and second wafer state data sets indicative of the at least one characteristic at first and second pluralities of sites on the at least one wafer.

3. The method of claim 2, wherein receiving the third wafer state data set comprises receiving a third wafer state data set indicative of the at least one characteristic at a third plurality of sites on the at least one wafer, the third plurality of sites being determined by the sampling plan.

4. The method of claim 3, wherein at least a portion of the first, second, and third plurality of sites overlap, and wherein forming the fourth data set comprises combining portions of the first, second, and third data sets associated with the overlapping portions of the first, second, and third plurality of sites, respectively.

5. The method of claim 3, wherein at least a portion of the first, second, and third plurality of sites overlap, and wherein forming the fourth data sent comprises comparing portions of the first, second, and third data sets associated with the overlapping portions of the first, second, and third plurality of sites, respectively.

6. The method of claim 5, further comprising calibrating at least one of the first and second data sets based upon the comparison.

7. The method of claim 5, further comprising matching the first and second data sets based upon the comparison.

8. The method of claim 1, further comprising determining whether the first and second wafer state data sets adequately characterize said at least one characteristic of said at least one wafer.

9. The method of claim 8, wherein determining the sampling plan comprises modifying an initial sampling plan to change at least one of a number of sites to be sampled, a sampling time, a sampling resolution, and a sampling granularity based upon at least one of the first and second wafer state data sets.

10. The method of claim 8, wherein the at least one wafer comprises a plurality of wafers, and wherein modifying the sampling plan comprises:

examining a reduced number of regions or wafers with at least one of higher accuracy, resolution granularity or time when the first and second wafer state data sets adequately characterize said at least one characteristic of said at least one wafer; and examining a larger number of regions or wafers with at least one of lower accuracy, resolution, granularity, or time when the first and second wafer state data sets do not adequately characterize said at least one characteristic of said at least one wafer.

11. The method of claim 1, wherein the first wafer measurement device is at least one of an in situ and an ex situ wafer measurement device, wherein the second wafer measurement device is at least one of an in situ and an ex situ wafer measurement device, and wherein the third wafer measurement device is at least one of an in situ and an ex situ wafer measurement device.

12. An apparatus, comprising:
means for receiving a first wafer state data set from a first wafer measurement device, the first wafer state data set being indicative of at least one characteristic of at least one wafer processed by a processing tool to form a portion of an electronic component of a semiconductor device, the electronic component being formed above said at least one wafer by the processing tool;
means for receiving a second wafer state data set from a second wafer measurement device, the second wafer state data set being indicative of the at least one characteristic of the at least one wafer processed by the processing tool;
means for determining a sampling plan for at least one third measurement device in response to determining whether the first and second wafer state data sets adequately characterize said at least one characteristic of said at least one wafer;
means for receiving at least one third wafer state data set from the third wafer measurement device, the third wafer state data set being collected according to the sampling plan and being indicative of said at least one characteristic of said at least one wafer;
means for forming a fourth wafer state data set using the first, second, and third wafer state data sets; and
means for determining the at least one characteristic of the at least one wafer based upon the fourth wafer state data set.

13. A manufacturing system, comprising:
at least one processing tool for processing at least one wafer to form a portion of an electronic component of a semiconductor device, the electronic component being formed above said at least one wafer by the processing tool;
a first wafer measurement device configured to provide a first wafer state data set indicative of at least one characteristic of the at least one wafer;
a second wafer measurement device configured to provide a second wafer state data set indicative of the at least one characteristic of the at least one wafer;
at least one third measurement device configured to provide a third wafer state data set indicative of said at least one characteristic of said at least one wafer using a sampling plan determined based on whether the first and second wafer state data sets adequately characterize said at least one characteristic of said at least one wafer; and
a wafer characterization unit configured to:
receive the first wafer state data set;
receive the second wafer state data set;
receive at least one third wafer state data set collected according to the sampling plan;
form a fourth wafer state data set using the first, second, and third wafer state data sets; and
determine the at least one characteristic of the at least one wafer based upon the fourth wafer state data set.

14. The system of claim 13, wherein the first wafer measurement device is configured to provide a first wafer state data set indicative of the at least one characteristic at a first plurality of sites on the at least one wafer and wherein the second wafer measurement device is configured to provide a second wafer state data set indicative of the at least one characteristic at a second plurality of sites on the at least one wafer.

15. The system of claim 14, wherein said at least one third wafer measurement device is configured to provide at least one third wafer state data set indicative of the at least one characteristic at a third plurality of sites on the at least one wafer.

16. The system of claim 15, wherein at least a portion of the first, second, and third plurality of sites overlap, and wherein the wafer characterization unit is configured to combine portions of the first, second, and third data sets associated with the overlapping portions of the first, second, and third plurality of sites, respectively.

17. The system of claim 15, wherein at least a portion of the first, second, and third plurality of sites overlap, and wherein the wafer characterization unit is configured to compare portions of the first, second, and third data sets associated with the overlapping portions of the first, second, and third plurality of sites, respectively.

18. The system of claim 17, wherein the wafer characterization unit is configured to calibrate at least one of the first, second, and third data sets based upon the comparison.

19. The system of claim 17, wherein the wafer characterization unit is configured to match the first, second, and third data sets based upon the comparison.

20. The system of claim 15, wherein the wafer characterization unit is configured to provide a signal indicating that a number of sites to be sampled for at least one of the third wafer state data set is to be increased or decreased based upon at least one of the first and second wafer state data sets, and wherein a number of sites to be sampled is increased or decreased based upon the signal.

21. The system of claim 15, wherein the wafer characterization unit is configured to provide a signal indicating that at least one of a sampling time, a sampling resolution, and a sampling granularity is to be modified, and wherein at least one of a sampling time, a sampling resolution, and a sampling granularity is modified based upon the signal.

22. The method of claim 15, wherein the at least one wafer comprises a plurality of wafers, and wherein the wafer characterization unit is configured to provide a signal indicating that a reduced number of regions or wafers is to be sampled with at least one of higher accuracy, resolution, granularity, or time when the first and second wafer state data sets adequately characterize said at least one characteristic of said at least one wafer and a larger number of regions or wafers is to be sampled with at least one of lower accuracy, resolution, granularity, or time when the first and second wafer state data sets do not adequately characterize said at least one characteristic of said at least one wafer.

* * * * *